United States Patent [19]

Ishii

[11] Patent Number: 4,596,617
[45] Date of Patent: Jun. 24, 1986

[54] PROCESS AND APPARATUS FOR JOINING A RUBBER SHEET MEMBER ON A DRUM

[75] Inventor: Ryutaro Ishii, Mitaka, Japan

[73] Assignee: Bridgestone Corporation, Tokyo, Japan

[21] Appl. No.: 647,590

[22] Filed: Sep. 6, 1984

[30] Foreign Application Priority Data

Dec. 21, 1983 [JP] Japan ............................... 58-239681

[51] Int. Cl.⁴ ........................................... B29D 30/08
[52] U.S. Cl. .................... 156/130.3; 156/134; 156/128.1; 156/405.1; 156/406.4
[58] Field of Search .................. 156/128.1, 130, 130.3, 156/133, 134, 405.1, 406.4, 406.6

[56] References Cited

U.S. PATENT DOCUMENTS

| | | | |
|---|---|---|---|
| 3,647,126 | 3/1972 | Dieterich et al. | 156/405.1 |
| 3,728,181 | 4/1973 | Simmons, Jr. | 156/405.1 |
| 3,847,705 | 11/1974 | Habert et al. | 156/406.6 |
| 4,361,454 | 11/1982 | Nakahama et al. | 156/187 |
| 4,371,410 | 2/1983 | Stevens | 156/405.1 |
| 4,409,872 | 10/1983 | Bertoldo | 156/405.1 |
| 4,448,627 | 5/1984 | Satoh et al. | 156/405.1 |
| 4,457,802 | 7/1984 | Yanagihara et al. | 156/405.1 |
| 4,465,536 | 8/1984 | Makino | 156/133 |

FOREIGN PATENT DOCUMENTS

| | | | |
|---|---|---|---|
| 58-42445 | 3/1983 | Japan | 156/405.1 |
| 2108060 | 8/1981 | United Kingdom . | |

Primary Examiner—Lois E. Boland
Attorney, Agent, or Firm—Sughrue, Mion, Zinn, Macpeak, and Seas

[57] ABSTRACT

A process and an apparatus for joining both free ends of a rubber sheet member for use in tire to each other on a drum are disclosed, which comprises winding a hanging portion of the rubber sheet member delivered onto and hung down from a conveyor belt through a festoon around the outer circumferential surface of the drum through a pressure roll, cutting the rubber sheet member laid on the conveyor belt at a position equal to the circumferential length of the drum when the front end of the rubber sheet member crossing over the top of the drum is detected by a sensor, and joining the cut back end of the rubber sheet member to the front end thereof on the drum through the pressure roll.

4 Claims, 4 Drawing Figures

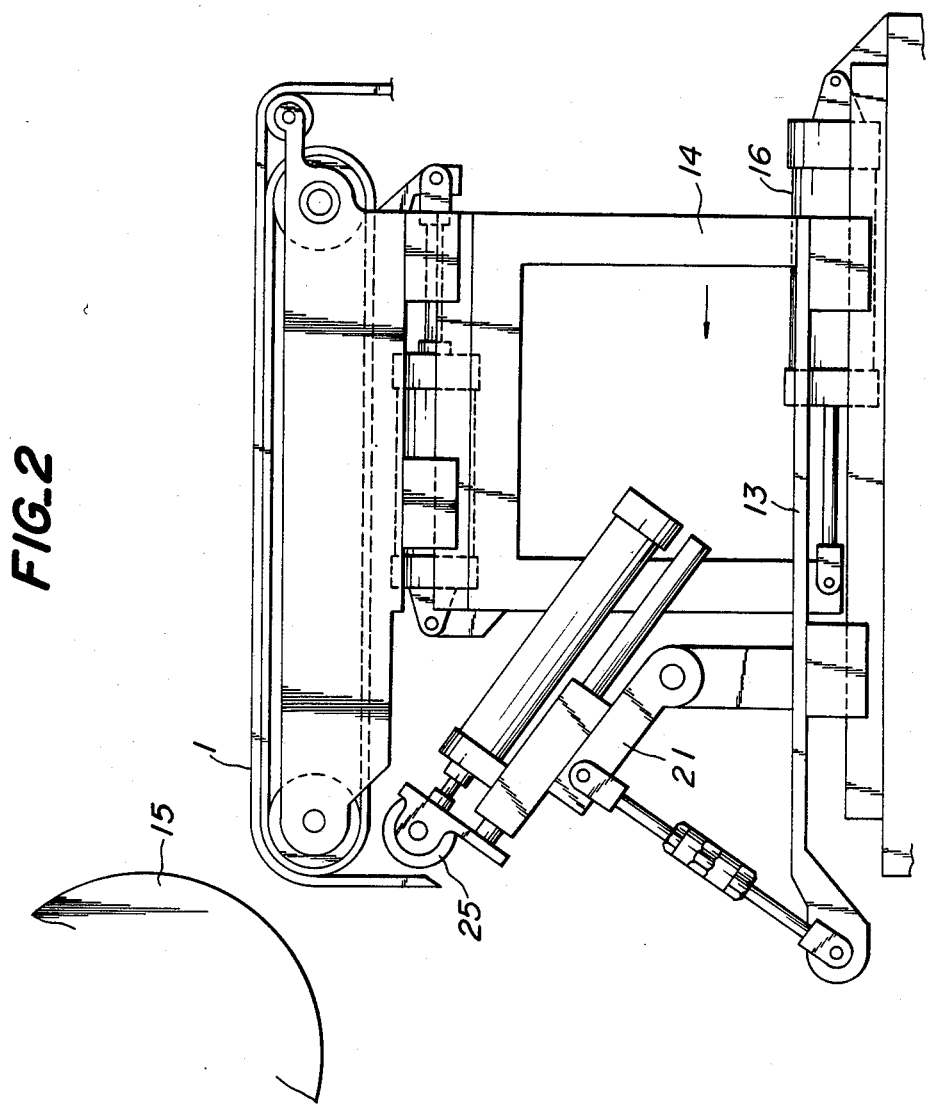

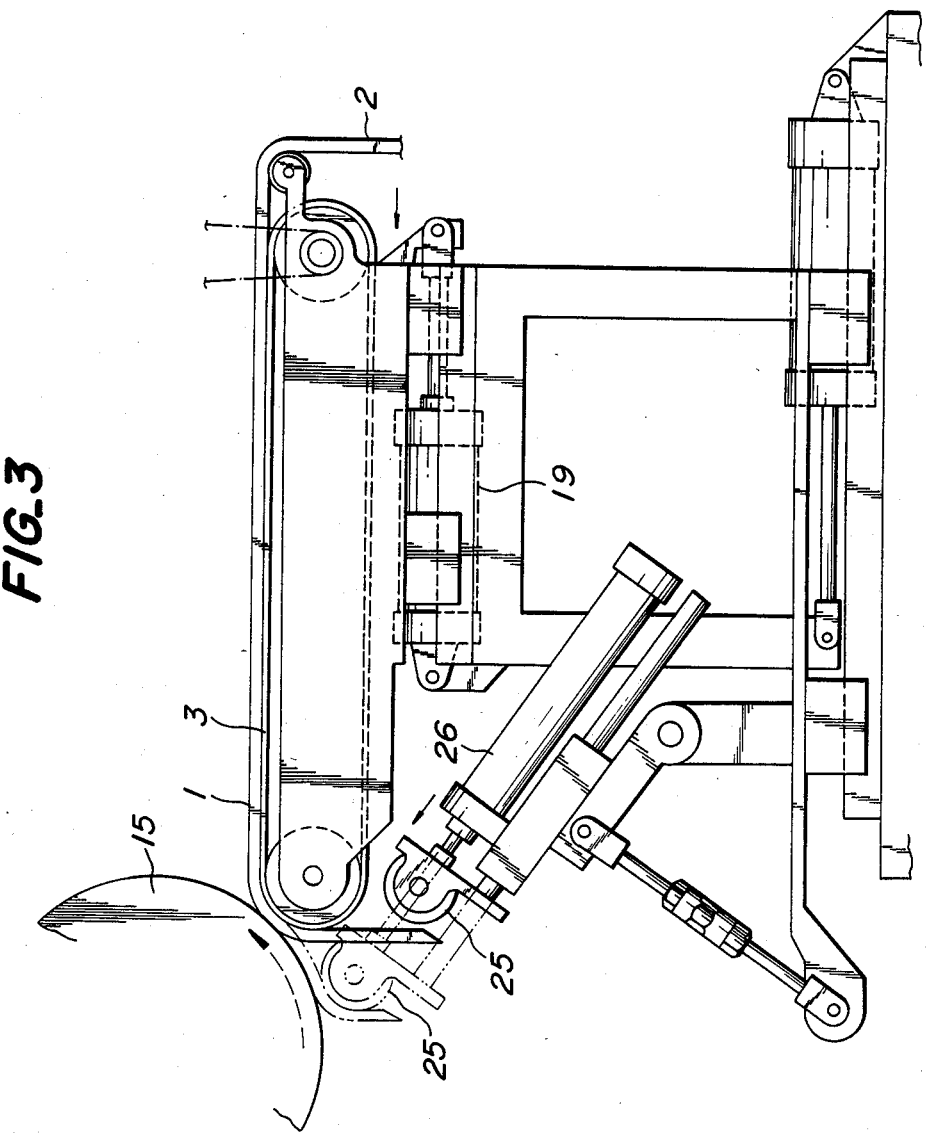

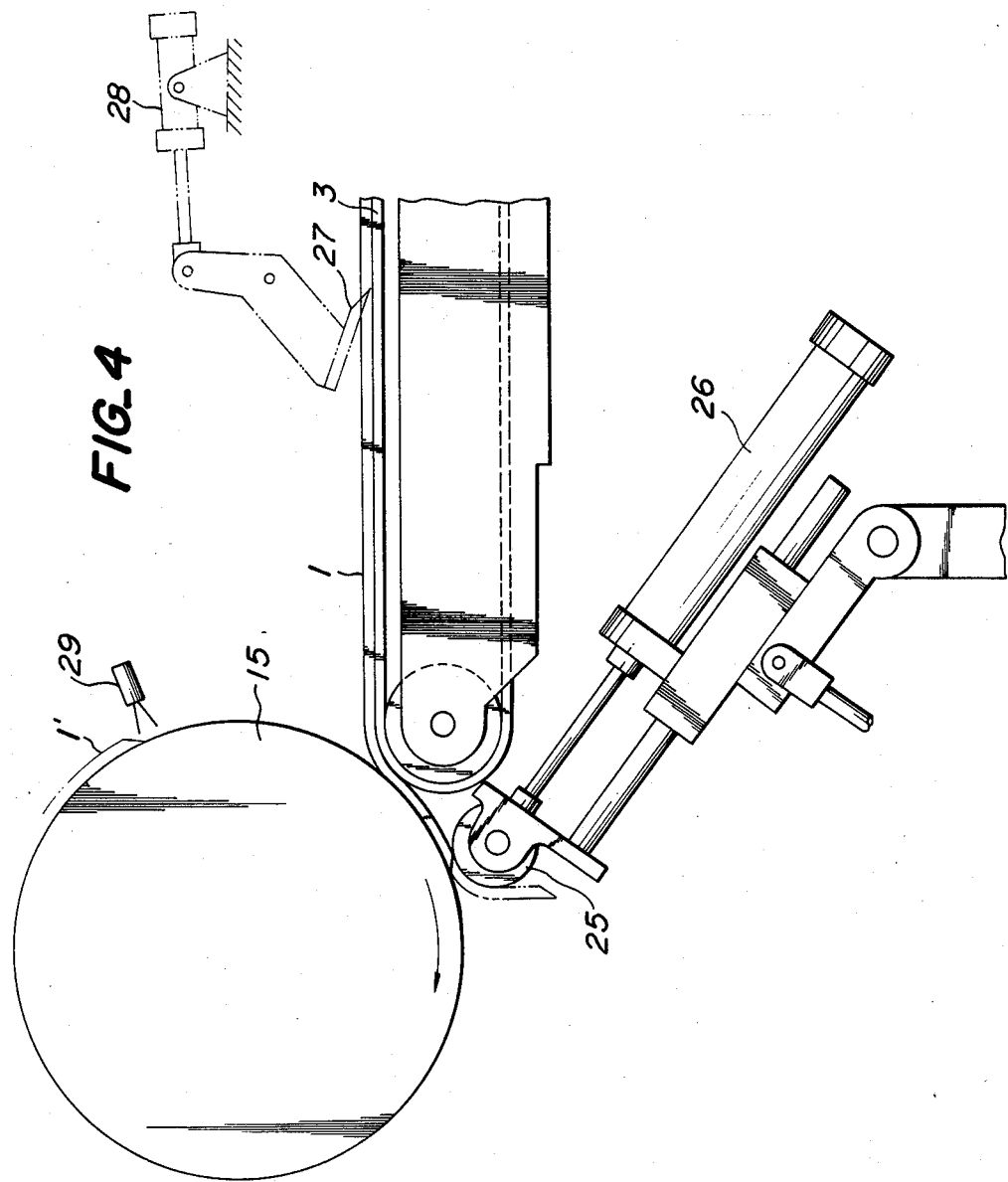

PROCESS AND APPARATUS FOR JOINING A RUBBER SHEET MEMBER ON A DRUM

BACKGROUND OF THE INVENTION

1. Field of the Invention

This invention relates to a process and an apparatus for joining both free ends of a rubber sheet member for use in tires to each other on a cylindrical drum.

2. Description of the Prior Art

In general, pneumatic rubber tires are a composite structure of various cords and rubber members. The rubber members include ply, breaker, belt and the like, each of which is a composite material of rubber and cords, as well as sheet-like rubber itself such as inner liner, tread ring or the like. In tire building, the rubber sheet member is usually wound on a so-called joint drum and the start- and finish-ends thereof are joined with each other to form a cylindrical shaped body irrespective of the presence of cords.

Given the recent trend for energy-saving, it is desired to automate the joint of the rubber sheet member, which has hitherto been made only by hand, and attempts for such automation are proceeding in accodance with this requirement.

For example, it has been proposed in U.S. Pat. No. 4,361,454 that a ply of a rubber sheet member is hung at a front end of a conveyor as a means for feeding the rubber sheet member and then applied onto a former or a joint drum by means of an application roller self-running on an orbit along the outer periphery of the former. However, the moving orbit of the application roller is inseparably related to the outer diameter of the former, so there is a problem in that guide means for the application roller should be provided every a former having a different outer diameter.

Furthermore, disclosed in GB-A-2,108,060 is an application roller for the start-end of the ply and a press roller for the remaining ply or the finish-end thereof are arranged at a front portion and lower portion of a ply feeding table, respectively, together with a mechanism for cutting the ply at a predetermined length. However, the start-end application roller is necessary to produce the deformation for ensuring the contact bonding of the ply start-end to an outer peripheral surface of a tire-building drum (i.e. the use of sponge is necessary), so that there is a problem in durability; otherwise, the bonding of the ply to the drum becomes incomplete and the ply separates from the drum before the ply start-end arrives at the pressure roller. Consequently there is a potential problem concerning the timing of the operation.

SUMMARY OF THE INVENTION

It is, therefore, an object of the invention to provide a simple and easy process in which an end of a rubber sheet member delivered from a coil of the rubber sheet member through a festoon thereof onto an upper surface of a conveyor belt can surely be transferred from the conveyor belt onto an outer peripheral surface of a joint drum and to propose an apparatus suitable for practising such a process.

According to a first aspect of the invention, there is the provision of a process for joining both free ends of a rubber sheet member for use in tire to each other, which comprises:

(a) hanging a front end of a rubber sheet member, which is delivered from a coil of the rubber sheet member through a festoon thereof onto an upper surface of a conveyor belt extending about a pair of pulleys mounted on a reciprocatably moving trestle, from a front end of the conveyor belt by a predetermined distance by the driving of the conveyor belt;

(b) propelling the conveyor belt together with the trestle and a retractably moving pressure roll laid on the trestle toward a cylindrical drum for the joining of the rubber sheet member;

(c) contacting the hanging portion of the rubber sheet member with the drum under pressure only by the advancement of the pressure roll;

(d) rotating the drum together with the pressure roll and the conveyor belt in a direction opposite to the feeding direction of the rubber sheet member for a moment at the same circumferential speed under the sandwiched state of the hanging portion between the drum and the pressure roll to pressure bond the hanging portion to the drum;

(e) winding the rubber sheet member around the drum while drawing from the conveyor belt by the positive rotation of the drum, during which the front end of the rubber sheet member is detected at a time of crossing over a top of the drum by means of a sensor to stop the rotation of the drum and at the same the rubber sheet member is cut by means of a cutter disposed at a position corresponding to a length of the rubber sheet member equal to the circumferential length of the drum;

(f) joining the cut back end of the rubber sheet member to the front end thereof by the further positive rotation of the drum and stopping the rotation of the drum; and (g) moving the pressure roll backward and returning the conveyor belt together with the trestle to the original position for repeating the steps (a) to (f).

According to a second aspect of the invention, there is the provision of an apparatus for joining both free ends of a rubber sheet member for use in tire to each other, which comprises a cylindrical drum for joining both the free ends of the rubber sheet member on the circumferential surface of the drum, a conveyor belt extending about a pair of pulleys in parallel with the axis of the drum, a trestle supporting the pulleys and reciprocatably moving to the drum, a pressure roll mounted on the trestle at an acute angle with respect to the upper surface of the conveyor belt and retractably moving to the drum, a clutched step motor acting to drive the conveyor belt so as to hang down a front end of the rubber sheet member delivered through a festoon thereof onto the conveyor belt by a predetermined distance from a front end of the conveyor belt, a cutter for cutting the rubber sheet member at a position equal to the circumferential length of the drum, and a sensor disposed opposite to the drum and acting to detect the front end of the rubber sheet member wound around the drum and crossed over the top thereof.

According to the invention, the front end of the rubber sheet hung from the front end of the conveyor belt is contacted with the circumferential surface of the cylindrical drum under pressure by the pressure roll moving toward the drum at the front and lower part of the conveyor belt and then firmly bonded to the drum by the reverse rotation of the drum, whereby the simple and sure joining stage can be properly achieved.

BRIEF DESCRIPTION OF THE DRAWING

FIGS. 1 to 4 are schematic views illustrating the steps for practicing the process according to the invention in order, respectivey.

DESCRIPTION OF THE PREFERRED EMBODIMENT

Figure 1:
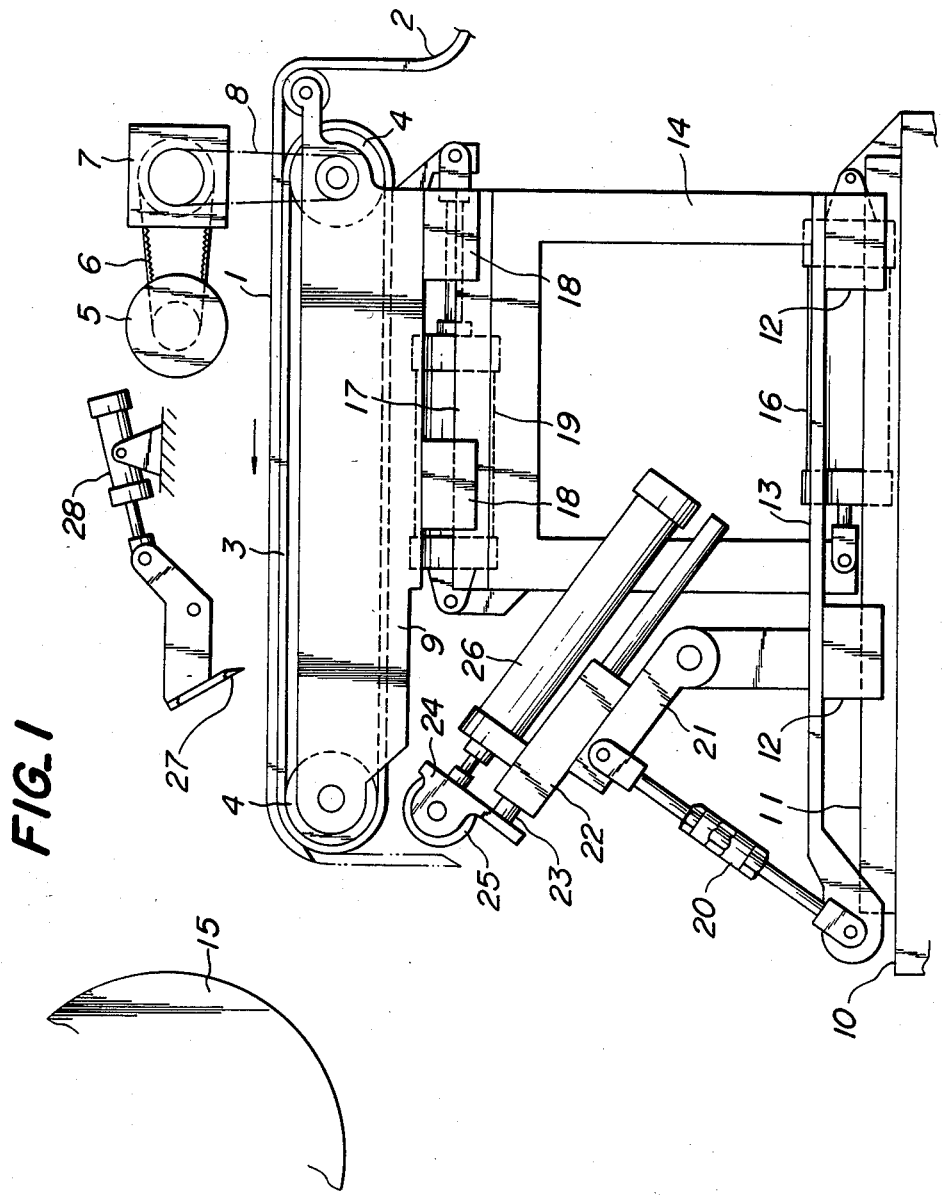

The invention will be described in detail with reference to the process for joining both free ends of an inner liner as a rubber sheet member together with an apparatus used for this process.

FIGS. 1 to 4 illustrate a main constructional part at each joining step for practicing the process according to the invention, respectively. In FIG. 1, numeral 1 is a rubber sheet member for the inner liner delivered from a coil of the rubber sheet member (not shown) through a festoon 2 thereof onto a conveyor belt 3.

The conveyor belt 3 is extended about a pair of pulleys 4, 4 and driven by a step motor 5 through a timing belt 6, a clutch 7 and a chain 8 so that the rubber sheet member 1 is sufficiently hung from the front end of the conveyor belt 3 over a predetermined distance between a delivery end position shown by a solid line and a hanging end position shown by a phantom line.

Further, the conveyor belt 3 includes a frame 9 rotatably supporting the pulleys 4, 4. This frame 9 is reciprocated to a cylindrical drum 15 for joining both free ends of the rubber sheet member by means of a trestle 14 mounted on a reciprocating table 13 having sliders 12 adaptable for a guide member 11 of a base 10. Numeral 16 is a cylinder propelling the trestle 14 together with the reciprocating table 13.

In the illustrated embodiment, the trestle 14 is also provided with guide members 17 fitted to sliders 18, 18 of the frame 9 to reciprocally move the frame 9 and hence the conveyor belt 3. Numeral 19 is a cylinder propelling the frame 9.

On the recioprocating table 13 a tilting base 21 is arranged, whose tilting angle can preferably be adjusted by a turnbuckle 20. The tilting base 21 is provided with a guide sleeve 22 receiving a guide rod 23 therein. To the upper end of the guide rod 23 is fixed a yoke 24 rotatably supporting a pressure roll 25. This pressure roll 25 is retractably moved relative to the trestle 14 toward the drum 15 by means of a cylinder 26 at an acute angle with respect to the upper surface of the conveyor belt.

In FIG. 1, numeral 27 is a cutter supported to the frame 9 by a proper means (not shown) and cutting the rubber sheet member 1 on the conveyor belt 3 at a predetermined length, and numeral 28 a cylinder for the operation of the cutter.

After the front end of the rubber sheet member 1 is moved at the position shown by the phantom line in FIG. 1 by the driving of the conveyor belt 3, the trestle 14 is propelled up to the vicinity of the cylindrical drum 15 by the actuation of the cylinder 16 as shown in FIG. 2, during which the pressure roll 25 is simultaneously propelled because the roll 25 is supported by the titlting base 21 mounted together with the trestle 14 onto the reciprocating table 13.

When the rubber sheet member 1 existent near the front end of the conveyor belt 3 reaches the position close to the outer circumference of the drum 15 as shown in FIG. 3, the pressure roll 25 is propelled toward the drum 15 by the actuation of the cylinder 26 to contact the hanging portion of the rubber sheet member 1 with the outer circumferential surface of the drum 15 under a pressure as shown by a phantom line in FIG. 3, while the tranmission system from the driving means or step motor 5 is made free by the clutch 7 shown in FIG. 1.

Thereafter, the cylinder 19 is slightly energized to propel only the conveyor belt 3 toward the drum 15, while the rotation of the drum 15 is reversed in an arrow direction shown by a broken line in FIG. 3 for a moment, whereby the rubber sheet member 1 is firmly bonded to the outer circumferential surface of the drum 15.

In this way, a portion of the rubber sheet member 1 protruding from the pressure roll 25 is interposed between the roll 25 and the drum 15 by the reverse rotation of the drum 15. That is, the first hanging portion of the rubber sheet member can be completely bonded over its whole length to the drum 15. In this case, the amount of the festoon is slightly increased by retracting the conveyor belt 3 over a distance corresponding to the length of the protruded part of the rubber sheet member 1, which has no influence on the subsequent step.

After the top end of the protruded part of the rubber sheet member 1 reaches the minimum gap between the drum 15 and the pressure roll 25, the drum 15 is positively rotated in an arrow direction shown by a solid line in FIG. 4, whereby the rubber sheet member 1 laid on the conveyor belt 3 is drawn out from the front end of the conveyor belt 3 under the racing of the conveyor belt and wound around the drum 15, during which the pressure contacting with the roll 25 is continued.

When the front end of the rubber sheet member 1 crosses over a top of the drum 15 as shown by a phantom line in FIG. 4, it is detected by the sensor 29 arranged opposite to the drum 15. By a signal output from the sensor 29 is stopped the rotation of the drum 15, while the cylinder 28 is actuated to cut the rubber sheet member 1 at a predetermined length under the cutting operation of the cutter 27 as shown by a phantom line in FIG. 4. In this case, it is a matter of course that the cutting position corresponds to a length enough to join the front end of the rubber sheet member with the cut end thereof on the drum and the increase or decrease of joint part can easily be adjusted.

After the cutter 27 is returned to its stand-by position, the positive rotation of the drum 15 is again started to bind the cut remaining part of the rubber sheet member to the drum. At this time, avoidance of superimposing a front end of a renewing rubber sheet member 1 on the rubber sheet member 1' wound around the drum 15 occurs by the retraction of the cylinder 19. Alternatively, the same effect can be achieved by slightly retracting the trestle 14 by the actuation of the cylinder 16 and additionally propelling the pressure roll 25 by a distance equal to the retracted distance of the trestle.

When the back end of the rubber sheet member 1 wound around the drum 15 is supported by the pressure roll 25 apart from the conveyor belt 3, the movement of the rubber sheet member laid on the conveyor belt is stopped. In this case, the stop position is substantially fixed, so that the clutch 7 is recombined with the pulley 4 to prevent the blind rotation of the conveyor belt 3, during which the joining through the pressure roll 25 can be completed.

Thereafter, the pressure roll 25 and the trestle 14 are returned to their initial positions (FIG. 1) by the retraction of the cylinders 26 and 16, respectively, whereby the steps starting from the driving of the step motor 5 can be repeated again.

As mentioned above, that portion of the rubber sheet member which is hung down from the front end of the conveyor belt can simply and adequately be bonded to the cylindrical drum by pressing between the drum and the pressure roll under the reverse rotation of the drum, so that the process for joining both free ends of the rubber sheet member can stably and efficiently be progressed without causing troubles in the winding onto the drum.

That is, according to the invention, the reliable transfer of the rubber sheet member to the drum can be simply and adequately performed by smoothly leading the gradual delivery of the rubber sheet member through the festoon thereof by means of the ordinary conveyor belt, whereby the accurate formation of a cylindrical shaped body fundamentally required in the step for the manufacture of pneumatic rubber tires can be realized efficiently. Further, the structure of the apparatus used for practising the above process can be simplified.

What is claimed is:

1. A process for joining both free ends of a rubber sheet member for use in a tire to each other, which comprises:

(a) hanging a front end of a rubber sheet member, which is delivered from a coil of the rubber sheet member through a festoon thereof onto an upper surface of a conveyor belt extending about a pair of pulleys mounted on a reciprocally moving trestle, from a front end of the conveyor belt by a predetermined distance by the driving of the conveyor belt;

(b) propelling the conveyor belt together with the trestle and a retractably moving pressure roll mounted for movement with the trestle toward a cylindrical drum said pressure roll capable of advancement independent of movement of said trestle;

(c) contacting the hanging portion of the rubber sheet member with the drum under pressure formed only by advancement of the pressure roll;

(d) rotating the drum together with the pressure roll and the conveyor belt in a direction opposite to the feeding direction of the rubber sheet member for a time sufficient to pressure bond the hanging portion of the drum at the same circumferential speed under the sandwiched state of the hanging portion between the drum and the pressure roll to pressure bond the hanging portion of the drum;

(e) winding the rubber sheet member around the drum while drawing said rubber sheet member from the conveyor belt by the positive rotation of the drum, during which the front end of the rubber sheet member is detected at a time of crossing over a top of the drum by means of a sensor to stop the rotation of the drum and, at the same time the rubber sheet member is cut by means of a cutter disposed at a position corresponding to a length of the rubber sheet member equal to the circumferential length of the drum;

(f) joining the cut back end of the rubber sheet member to the front end thereof by the further positive rotation of the drum and stopping the rotation of the drum; and (g) moving the pressure roll backward and returning the conveyor belt together with the trestle to the original position for repeating the steps (a) and (f).

2. The process according to claim 1, wherein said pressure roll is advanced toward said drum by means of a cylinder for propelling said pressure roll at step (c).

3. The process according to claim 1, wherein said conveyor belt is further moved toward said drum by means of a cylinder propelling a frame for supporting said conveyor belt after step (c).

4. The process according to claim 1, wherein a drive system for said conveyor belt is disengaged during the rotation of said drum in the direction opposite to the feeding direction of the rubber sheet member at step (d).

* * * * *